United States Patent
Zhang (10) Patent No.: US 11,163,443 B2
(45) Date of Patent: Nov. 2, 2021

(54) METHOD AND APPARATUS FOR CONTROLLING STORAGE OPERATIONS OF DATA OF REGION OF INTEREST

(71) Applicant: Beijing Horizon Robotics Technology Research and Development Co., Ltd., Beijing (CN)

(72) Inventor: Xinyu Zhang, Beijing (CN)

(73) Assignee: Beijing Horizon Robotics Technology Research and Devlopment Co., Ltd., Beijing (CN)

(*) Notice: Subject to any disclaimer, the term of this patent is extended or adjusted under 35 U.S.C. 154(b) by 13 days.

(21) Appl. No.: 16/713,895

(22) Filed: Dec. 13, 2019

(65) Prior Publication Data

US 2020/0192574 A1 Jun. 18, 2020

(30) Foreign Application Priority Data

Dec. 17, 2018 (CN) .......................... 201811541063.2

(51) Int. Cl.
G06F 3/06 (2006.01)

(52) U.S. Cl.
CPC .......... *G06F 3/0604* (2013.01); *G06F 3/0647* (2013.01); *G06F 3/0656* (2013.01); *G06F 3/0659* (2013.01); *G06F 3/0673* (2013.01)

(58) Field of Classification Search
CPC ..... G06F 3/0673; G06F 3/0604; G06F 3/0656
See application file for complete search history.

(56) References Cited

U.S. PATENT DOCUMENTS

| | | | |
|---|---|---|---|
| 2011/0304447 A1* | 12/2011 | Marumoto | G07C 5/085 340/438 |
| 2017/0090777 A1* | 3/2017 | Horn | G06F 3/0652 |
| 2017/0357449 A1* | 12/2017 | Bashir | H04L 65/605 |
| 2020/0252577 A1* | 8/2020 | Teruuchi | H04N 7/188 |

* cited by examiner

Primary Examiner — Edward J Dudek, Jr.
(74) Attorney, Agent, or Firm — Lando & Anastasi, LLP (57) ABSTRACT

Disclosed are a method and an apparatus for controlling storage operations of data of Region of Interest (ROI). The method may include obtaining data of a first ROI, determining to keep the data of the first ROI according to a score of the first ROI, and overriding data of a second ROI already stored in a storage region for storing ROI data with the data of the first ROI in a case where a remaining capacity of the storage region is insufficient. Related electric device and non-transitory computer readable medium are also disclosed.

17 Claims, 8 Drawing Sheets

METHOD AND APPARATUS FOR CONTROLLING STORAGE OPERATIONS OF DATA OF REGION OF INTEREST

CROSS-REFERENCE

The present disclosure claims a benefit of, and priority to, Chinese patent application No. 201811541063.2, entitled "METHOD AND APPARATUS FOR CONTROLLING STORAGE OPERATIONS OF DATA OF REGION OF INTEREST," filed on Dec. 17, 2018, the disclosure of which is hereby incorporated by reference herein in its entirety.

TECHNICAL FIELD OF THE DISCLOSURE

The present disclosure relates to a method and an apparatus for controlling storage operations of data of Region of Interest (ROI).

BACKGROUND

Effect multi-stage object detection methods, such as Regions with CNN features (RCNN), Spatial Pyramid Pooling Network (SPP-Net), Fast RCNN, and Faster RCNN, are based on ROI proposals or a Proposal operation. However, a huge number of ROIs which may be generated by the Proposal operation cause the multi-stage object detection methods unsuitable to implement in an artificial intelligence (AI) chip with limited hardware resources.

SUMMARY

In an aspect, a method for controlling storage operations of ROI data is disclosed. The method may include obtaining data of a first ROI, determining to keep the data of the first ROI according to a score of the first ROI, and overriding data of a second ROI already stored in a storage region for storing the ROI data with the data of the first ROI in a case where a remaining capacity of the storage region is insufficient.

In another aspect, disclosed is a non-transitory computer readable medium having program instructions stored thereon. The program instructions, when being executed by a processor, may cause the processor perform at least the above method.

In another aspect, an apparatus for controlling storage operations of ROI data is disclosed. The apparatus may include a processor and a buffer. The processor may be configured to cause the apparatus to perform at least the above method. The buffer may be configured to buffer at least the data of the first ROI.

In another aspect, an apparatus for controlling storage operations of ROI data is disclosed. The apparatus may include a buffer, a first circuit, a second circuit, and a storage control circuit. The buffer may be configured to buffer obtained data of a first ROI. The first circuit may be configured to determine whether to keep the data of the first ROI according to a score of the first ROI. The second circuit may be configured to instruct to override data of a second ROI already stored in a storage region of a memory for storing the ROI data with the data of the first ROI to be kept in a case where a remaining capacity of the storage region is insufficient. The storage control circuit may be configured to control to store the data of the first ROI into the storage region according to an instruction from the second circuit.

In another aspect, an electric device including the above apparatus is disclosed.

BRIEF DESCRIPTION OF THE DRAWINGS

The above and other objects, features and advantages of the present disclosure will become more obvious by describing the embodiments of the present disclosure in more details with reference to the drawings. The drawings provide further understanding of the embodiments of the present disclosure and constitute a portion of the specification. The drawings, together with the embodiments of the present disclosure, are used to explain this disclosure but do not constitute restrictions on the disclosure. In the drawings, the same reference number generally refers to the same portion or step.

DETAILED DESCRIPTION

Through the method and apparatus according to embodiments of the disclosure, for example, the number of ROIs may be controlled effectively and the accuracy of detection may be ensured.

Hereinafter, exemplary embodiments according to the present disclosure will be described in details with reference to the drawings. It is obvious that the described embodiments are some embodiments of the present disclosure rather than all, and it is appreciated that the present disclosure is not limited to the exemplary embodiments described herein.

Multi-stage detection methods, such as RCNN, SPP-Net, Fast RCNN, and Faster RCNN, may generate a large number of ROI based on the Proposal operation, based on which subsequent operations, such as ROI filtering, ROI transformation, ROI alignment, ROI sorting, and non-maximal suppression, may be performed.

For example, an AI chip may be equipped with one or a small number of on-chip processors and on-chip memories with low capacities, due to considerations and/or limitations in aspects such as cost and chip space.

It is difficult for the AI chip to execute independently and/or efficiently operations in an multi-stage object detection method based on the Proposal operation, for example at least before Non-maximum Suppression (NMS), due to hardware limitations, rendering that a terminal device requiring high processing efficiency and low power consumption, such as a mobile phone, has to abandon the multi-stage object detection method with better detection effects, such as Faster RCNN, and in turn to adopt a single-stage object detection method such as Tiny-SSD.

Various example embodiments provide an improved method and apparatus for controlling the storage operations of ROI data.

Figure 1:
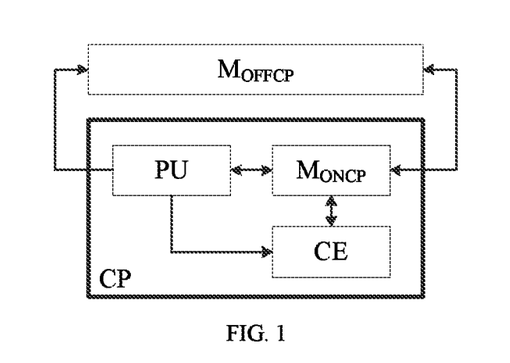
FIG. 1 shows an example system according to an embodiment.

To facilitate descriptions, an example system, to which the method and apparatus according to embodiments of the disclosure may be applied, is shown in FIG. 1.

As shown in FIG. 1, the example system may include an AI chip (also shortened as "a chip" herein if there is no confusion) CP and an off-chip memory $M_{OFFCP}$ The AI chip CP may include an on-chip processor PU, an on-chip memory $M_{ONCP}$, and a calculation engine CE, which are implemented on the same chip or die.

Based on different chip architectures, the on-chip processor PU may be a lightweight processor kernel developed based on, for example, a Graphics Processing Unit (GPU), an Advanced Reduced Instruction Set Computing (RISC) Machine (ARM) processor, a Field Programmable Gate Array (FPGA), or the like. For example, the on-chip processor PU may be a RISC soft processor kernel developed based on FPGA. The on-chip processor PU may be started when being powered on, and may execute predetermined instruction sequences, for example including an operating system on chip, executable instruction sequences pre-compiled for a pre-designed artificial neural network, so as to perform logic operations other than operations of the artificial neural network, and/or may provide control instructions and related parameters to other components or circuits in the AI chip CP so that the other components or circuits in the chip may be enabled to perform corresponding operations in response to received instructions.

Figure 2:
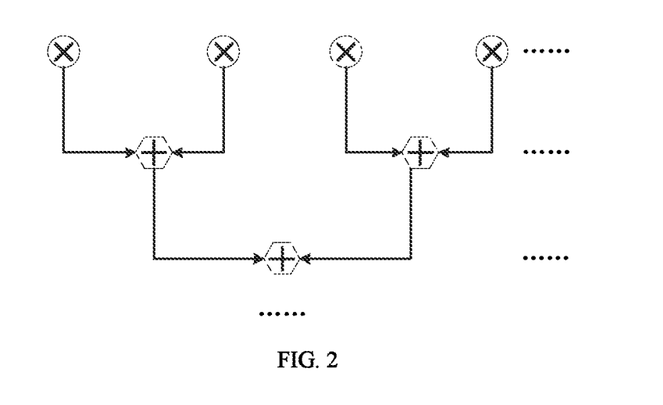
FIG. 2 shows an example of a calculation engine CE in the example system of FIG. 1.

The calculation engine CE may execute the operations of the artificial neural network in response to the instructions and parameters from the on-chip processor PU. For example, in an AI chip for a convolutional neural network, the calculation engine CE may include a convolution operation acceleration kernel circuit, a pooling operation acceleration kernel circuit, and the like. For example, the convolution operation acceleration kernel circuit may include one or more multiplication accumulator arrays, each of which may include a plurality of multiplication accumulators. For example, as shown in FIG. 2, each multiplication accumulator may include a plurality of multipliers (denoted by circles with multiplication symbols in FIG. 2) and a plurality of adders (denoted by hexagons with addition symbols in FIG. 2). Both the multipliers and the adders are commonly used electronic devices, structures of which are omitted herein.

The system or chip according to embodiments of the present disclosure may not be limited to the circuit structures and control flows of the calculation engine CE. For example, the system or chip in another embodiment may not include a dedicated calculation engine CE.

The on-chip memory $M_{ONCP}$ may be any suitable high speed memory embodied on the chip CP, such as a cache or a static random access memory, whose data access rate may match with the processing speed of other components on the chip, such as the on-chip processor PU and the calculation engine CE. In various embodiments, the on-chip memory $M_{ONCP}$ may include one or more independent high speed memories. For example, in an embodiment, one or more input on-chip memories may be configured for data for calculation from the off-chip memory $M_{OFFCP}$, and one or more output on-chip memories may be configured for data which are to be output to the off-chip memory $M_{OFFCP}$, for example from the on-chip processor PU and/or the calculation engine CE. In another embodiment, one or more on-chip memories may be configured for both input data and output data. In an embodiment, the on-chip memory $M_{ONCP}$ may be a memory or a storage system supporting a two-dimensional access to data or allowing a direct access to two-dimensional data.

The system or chip in embodiments of the present disclosure may be not limited to configurations and access control strategies of the on-chip memory $M_{ONCP}$.

In FIG. 1, apparatuses, components, elements, modules, or circuits at both ends of a connection may be connected or coupled together directly through, for example, a data bus and/or an instruction bus, and may also be connected or coupled together indirectly via other intermediary apparatuses, components, elements, modules, or circuits, such as a crossbar. Arrows of a connection may show a flow direction of focused instruction and/or data, but do not mean that the instructions and/or data only flow in the direction indicated by the arrows.

For example, the on-chip processor PU may instruct a data exchange between the on-chip memory $M_{ONCP}$ and the off-chip memory $M_{OFFCP}$, and may instruct the calculation engine CE to execute operations based on data in the on-chip memory $M_{ONCP}$ and to output results to the on-chip memory $M_{ONCP}$. For example, the on-chip processor PU may also execute other logic operations and/or controls based on data in the on-chip memory $M_{ONCP}$ and/or the off-chip memory $M_{OFFCP}$. The operations between the on-chip processor PU and the on-chip memory $M_{ONCP}$ may be lower than the operations between the calculation engine CE and the on-chip memory $M_{ONCP}$, leading to a time cost in switching.

For brevity, a part of circuits or components on the AI chip CP are illustrated in FIG. 1, with some other possible components or modules or circuits or units or elements omitted, such as a timing controller for instruction timing control, an interrupt controller for instruction interrupt control, a crossbar and/or multiplexer for interconnections among components, a coprocessor, and an off-chip data transfer manager for controlling access to data in the off-chip memory $M_{OFFCP}$.

It is appreciated that the example as shown in FIG. 1 is to facilitate the description, but a system or scene where the method and apparatus according to the embodiments of the present disclosure may be applied is not limited to the AI chip shown in FIG. 1.

Figure 3:
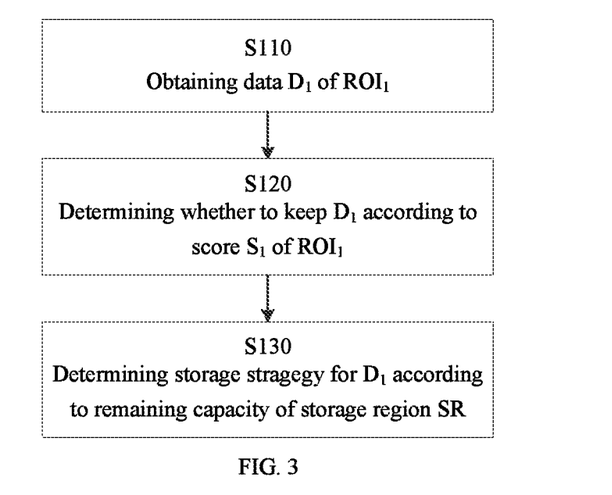
FIG. 3 shows an example method for controlling storage operations of ROI data according to an embodiment.

FIG. 3 shows an example method for controlling the storage operations of the ROI data according to an embodiment. The example method may include a step S110 of obtaining data $D_1$ of $ROI_1$ (also called herein as the "first ROI"), a step S120 of determining whether to keep $D_1$ according to a score $S_1$ of $ROI_1$ wherein $D_1$ may be determined to be kept if the score $S_1$ of $ROI_1$ satisfies a predetermined condition, and a step S130 of determining a storage strategy for $D_1$ according to a remaining capacity of a storage region SR for storing in the on-chip memory $M_{ONCP}$ for storing ROI data wherein the storage strategy may include overriding data $D_2$ of $ROI_2$ (also called herein as a second ROI) already stored in the storage region SR with $D_1$ when the remaining capacity of the storage region SR is insufficient.

Through the example method, for example, the number of ROI data finally available for subsequent processing operations of the object detection method may depend on the capacity of the storage region SR, so that the final number of the ROI data may be controlled effectively.

More details of the example method in FIG. 3 will be described below.

As shown in FIG. 3, the example method of the embodiment may start at the step S110.

In the step S110, in an embodiment, for an input image, data $D_1$ of $ROI_1$ of one or more objects of interest in the image may be obtained in any suitable manners. For example, the data $D_1$ of $ROI_1$ may be obtained through various suitable proposal operations such as RPN and SS. For example, the step S110 may correspond to an operation for generating data $D_1$ of a single $ROI_1$ in a proposal operation.

The data $D_1$ of $ROI_1$ obtained by the proposal operation may include information such as key point coordinates, a size, a shape, and a score (e.g. confidence) of $ROI_1$.

In an embodiment, instead of the confidence of each ROI, a substitute value for the confidence of each ROI may be obtained. Each substitute value may be a value obtained by omitting a nonlinear operation (for example, a sigmoid function, a Tanh function, a ReLU function) during determining the confidence.

Further, the substitute value may be quantized to a predetermined precision (for example, a 8-bit precision), or the substitute value within a predetermined precision range may be used, so as to limit the number of substitute values.

In another embodiment of the step S110, for example, the obtaining data $D_1$ of $ROI_1$ may include receiving the data $D_1$ of $ROI_1$ from outside via a data interface and a network interface, receiving or reading the data $D_1$ of $ROI_1$ output by another procedure which is independent from the example method of FIG. 3 and is executed by the on-chip processor PU and/or an off-chip processor, or the like.

The data $D_1$ obtained in the step S110 may be buffered in a buffer. In an embodiment, the buffer may be a cache independent from the on-chip memory $M_{ONCP}$. In another embodiment, a storage region in the on-chip memory $M_{ONCP}$ different from the storage region SR may be used as the buffer.

Figure 4:
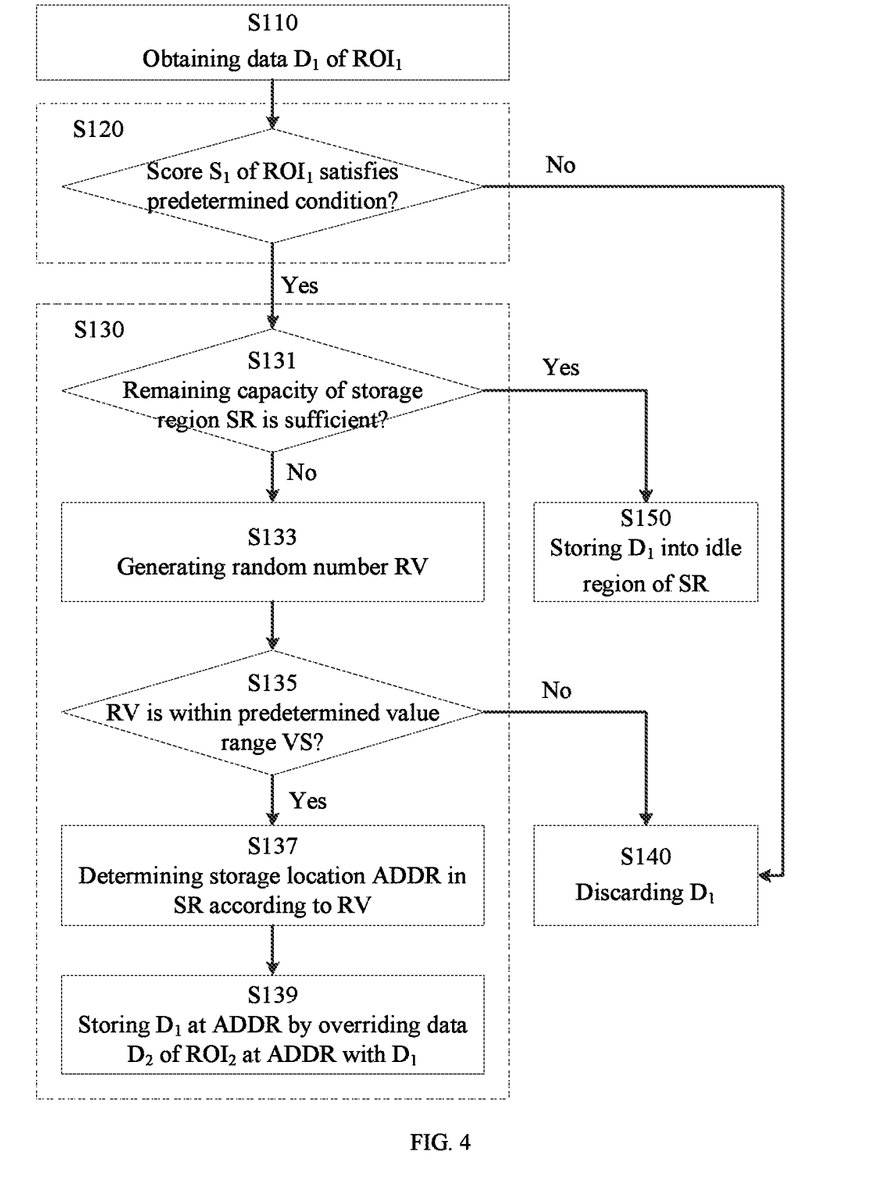
FIG. 4 shows an example method for controlling storage operations of ROI data according to an embodiment.

Then, the example method of FIG. 3 may proceed to the step S120. As shown in FIG. 4, in the step S120, it may be determined whether the score $S_1$ of $ROI_1$ satisfies a predetermined condition. As described above, the score $S_1$ of $ROI_1$ may include the confidence of $ROI_1$ or the substitute value for the confidence.

In various embodiments, the predetermined condition may include one or more of followings: the score $S_1$ of $ROI_1$ being within a predetermined threshold range, the score $S_1$ of $ROI_1$ being greater than or equal to a threshold, the score $S_1$ of $ROI_1$ being greater than a threshold, and the score $S_1$ of $ROI_1$ being less than or equal to a threshold. In various embodiments, such predetermined conditions may be predetermined or input as needed.

In a case where the score $S_1$ of $ROI_1$ is the confidence of $ROI_1$, for example, a threshold $T_{nl}$ may be determined as 0.7 or 0.8, and the predetermined condition checked in the step S120 may be the score $S_1$ of $ROI_1$ being greater than or equal to 0.7 or 0.8, or the like.

When the score $S_1$ of $ROI_1$ is a substitute value for the confidence of $ROI_1$, a threshold $T_1$ for the substitute value may be determined based on the threshold $T_{nl}$.

For example, the threshold $T_1$ may be determined based on the threshold $T_{nl}$ through the following equation (1):

$$T_1 = (T_{nl} - 1/2) * 2^n \quad (1)$$

where n may be the number of bits corresponding to a fractional part in a fixed point number format for representing the substitute value. For example, when adopting the fixed point number format m·n (m represents the number of bits corresponding to the integer part, and m+n+1=8) with a 8-bit precision to represent the substitute value, the number of bits corresponding to the fractional part, i.e. the number n, may be a value greater than or equal to 5 and less than or equal to 7.

In another example, the following equation (2) may also be used to determine the threshold $T_1$ may be determined based on the threshold $T_{nl}$ by the following equation (2) for better processing precision and to avoid filtering too many ROIs.

$$T_1 = T_{nl} * 2^n \quad (2)$$

Then, for example, if n=5 and $T_{nl}$=0.7, the threshold of the confidence substitution value used in the step S120 may be $T_1$=0.7*25=22.4, and the predetermined condition to be check may be whether the score $S_1$ of $ROI_1$ is greater than or equal to 22.4, and the like.

Through the step S120, only ROI whose score satisfies the predetermined condition (for example, with a sufficiently high confidence) can be kept, so that the final number of ROIs may be controlled.

When the score $S_1$ of $ROI_1$ does not satisfy the predetermined condition (checking result: "No"), it may be determined that $D_1$ is not kept. Then, as shown in FIG. 4, the method may proceed to the step S140 and may discard $D_1$.

When the score $S_1$ of $ROI_1$ satisfies the predetermined condition (checking result: "Yes"), it may be determined to keep $D_1$. Then, the method may proceed to the step S130, so as to determine the storage strategy for $D_1$ according to the remaining capacity of the storage region SR for storing the ROI data in the on-chip memory $M_{ONCP}$.

As shown in FIG. 4, in the step S130, it may be checked in a sub-step S131 whether the remaining capacity of the storage region SR pre-allocated for storing the ROI data in the on-chip memory $M_{ONCP}$ is sufficient.

The total capacity of the storage region SR may be determined according to the total capacity of the on-chip memory $M_{ONCP}$ and the total number N of ROIs to be finally stored in the on-chip memory $M_{ONCP}$. For example, if the maximum possible size of each ROI is s, the total capacity of the storage region SR may be N*s which is less than or equal to the total capacity of the on-chip memory $M_{ONCP}$.

In an embodiment, a counter may be configured to count the number of ROIs stored in the storage region SR.

For example, a counting value of the counter may be initialized as 0. Then, the example method of FIG. 3 or FIG. 4 may be performed for the data $D_1$ of $ROI_1$. In the sub-step S131, if the counting value is less than N, it may be determined that the remaining capacity of the storage region SR is sufficient, otherwise insufficient. If the data $D_1$ is stored in the on-chip memory $M_{ONCP}$ through the step S130 in FIG. 3 or FIG. 4, the counting value may be incremented by 1, otherwise unchanged.

In another embodiment, the counting value of the counter may be initialized as a maximum value, and the counting value 0 may represent an insufficient remaining capacity of the storage region SR. Then, if the data $D_1$ is stored in the on-chip memory $M_{ONCP}$ through the step S130 in FIG. 3 or FIG. 4, the counting value may be decremented by 1, otherwise unchanged.

In another embodiment, a contiguous storage region in the on-chip memory $M_{ONCP}$ may be allocated in advance as the storage region SR, and then the data of each ROI is controlled to be stored continuously in the storage region SR. In this embodiment, it may be determined whether the capacity of the storage region between a start address of the idle portion in the storage region SR and an end address of the storage region SR is greater than or equal to the size of the data $D_1$ of $ROI_1$. If yes, it may be determined that the remaining capacity of the storage region SR is sufficient, otherwise insufficient.

If the remaining capacity of the storage region SR is sufficient, as shown in FIG. 4, the data $D_1$ may be stored into the idle portion in the storage region SR in the step S150. When adopting the counter, in the step S150, the counting value may be incremented or decremented by 1.

In various embodiments, the total number N of ROIs may be a value of thousands, for example 2000, 4000, and 8000, so as to ensure the precision of the final detection result.

Figure 5:
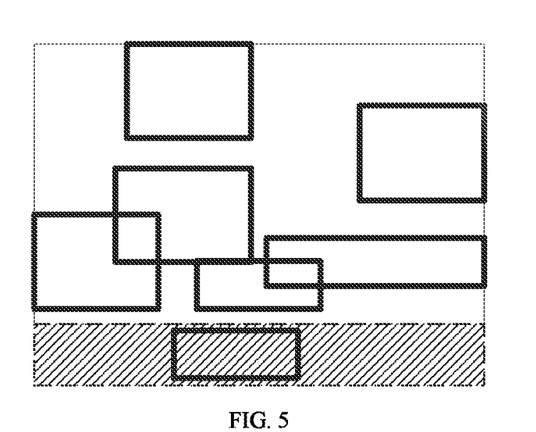
FIG. 5 shows an example storage status of ROI data according to an embodiment.

As a possible storage strategy for $D_1$ when the remaining capacity of the storage region SR is insufficient, for example, $D_1$ may be discarded directly. However, for example, as shown in FIG. 5, among ROIs (represented by internal solid frames in FIG. 5) of an image (represented by the outmost solid frame in FIG. 5), ROIs in a region (for example, the shaded portion in the lower part of FIG. 5) may be discarded, which may affect the precision of final detection result.

To ensure the precision, for example, the total number N of ROIs may be as large as possible. However, this requires a larger capacity of storage region SR. Moreover, the value of N also depends on the input image and targets to be detected. For example, for PASCAL VOC data sets, when adopting the above possible storage strategy, the precision of the final detection result cannot be ensured unless configure N above 8192. For other data set, the suitable value of N may be different.

Thus, in an embodiment, as storage strategy for $D_1$, redundancy of outputs of the artificial neural network for the object detection may be utilized to control randomly whether to continue to keep $D_1$ and which ROI data already stored in the storage region SR is replaced with $D_1$. Based on rigorous mathematical proofs and a large number of experimental results, the more the randomness is, the more accuracy and precision of the final result may be ensured.

For example, for the PASCAL VOC data set, if adopting the random control, almost no precision loss may be achieved in the final detection result when N=2000. To be more reliable, N=4000 may be configured, such that the accuracy and precision of the final detection result may be ensured while the final number of ROIs may be reduced to a degree suitable for the on-chip memory $M_{ONCP}$.

As shown in FIG. 4, in the step S130, when "No" is determined in the sub-step S131, a random number RV may be generated in a sub-step S133. A predetermined value range VS may be predetermined for the random number RV according to the total capacity of the storage region SR or the number N, for example VS=[1,N].

Figure 6:
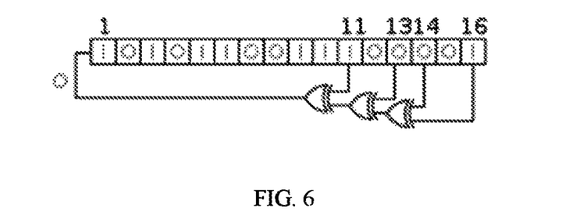
FIG. 6 shows an example linear feedback shift register for generating random numbers according to an embodiment.

In an embodiment, a random number may be generated by a linear feedback shift register (LFSR) as shown in FIG. 6. For example, a K-bit LFSR may generate a random number RV' between [1, $2^K$−1].

The value of K may be selected such that $2^K$ is much larger than N, so as to enhance the randomness of the LFSR.

For example, in the example of FIG. 6, a configuration with N=4095, K=16, and VS=[1, 4095], may be adopted. Then, the random number RV may be determined as RV=RV' % $2^K$=RV' % 4096.

Also, the probability of discarding $D_1$ may be adjusted by changing the predetermined value range VS and/or the manner of determining RV based on RV'. For example, when VS=[0, 3999] and RV=RV' % ($2^K$)=RV' % 4096, $D_1$ may be discarded if the value of RV belongs to [4000, 4095]. Thus, the probability of discarding D1 becomes higher.

Modulo operation with a power of 2 as a divisor may be realized simply and efficiently by a bit interception. Thus, when RV=RV' % ($2^K$), the random number RV may be determined easily and efficiently by utilizing hardware features, for example, may be determined in a single clock cycle.

However, the manner of determining RV based on RV' is not limited to RV=RV' % ($2^K$). For example, when VS=[0, 3999], the value of RV may also be determined according to RV=RV' % (4000+x), wherein the adjustment amount x may be an integer greater than or equal to 0.

Then, it may be detected in the sub-step S135 whether the random number RV is within the predetermined value range VS. For example, in the example of FIG. 6, the generated random number RV may be a value within [0, 4095], and it may be detected in the sub-step S135 whether the random number RV is within a predetermined value range VS=[1, 4095].

If the random number RV is not within the predetermined value range VS, that is, the check result of the sub-step S135 is "No", the method may proceed to the aforementioned step S140 to discard $D_1$. For example, in the example of FIG. 6, if the random number RV=0, $D_1$ is discarded.

If the random number RV is within the predetermined value range VS, that is, the check result of the sub-step S135 is "Yes", the method may proceed to the sub-step S137 to determine a storage location ADDR in the storage region SR according to the random number RV. For example, the random number RV may be used as an offset from the start address of the storage region SR, and the storage location ADDR may be determined by adding RV to the start address of the storage region SR.

At this time, the remaining capacity of the storage region SR is insufficient, meaning that data D2 of another $ROI_2$ has already been stored at the storage location ADDR. $ROI_1$ and $ROI_2$ are also called herein as the first ROI and the second ROI, respectively, so as to distinguish the two ROIs.

Thus, as shown in FIG. 4, in the sub-step S139, the data $D_1$ may be stored at the storage location ADDR in the storage region SR by overriding the data $D_2$.

When adopting the counter to count the number of ROIs already stored in the storage region SR, the counting value of the counter may be incremented by 1 at any suitable time after determining "Yes" in the sub-step S135, for example, after the data $D_1$ is stored successfully in the storage region SR in the sub-step S139.

As described above, the probability of discarding D1 may be adjusted by adjusting the predetermined value range VS and/or the manner of determining RV based on RV'. For example, when N=4095, K=16, VS=[1, 4095], and RV=RV' % ($2^K$)=RV' % 4096, the probability of executing the sub-steps S137 and S139 is obviously much higher than the probability of executing the step S140. When N=4000, VS=[0, 3999], and RV=RV' % ($2^K$)=RV' % 4096, the probability of executing the step S140 may be improved.

For example, when the ROI data stored in the on-chip memory $M_{ONCP}$ are determined to be more useful for subsequent operations, the probability of executing the sub-steps S137 and S139 may be less than the probability of executing the step S140.

Usually, it is impossible to determine in advance which ROI data are more useful among massive ROI data. For example, the number of originally generated ROI data may be millions or several hundred thousand ROI data, and even after filtering based on scores, the number of left ROI data may still be tens of thousands.

Thus, in an embodiment, the probability of executing the sub-steps S137 and S139 (i.e. the probability of the random number RV being within the predetermined value range VS) may be greater than or equal to the probability of executing the step S140 (i.e. the probability of the random number RV being outside of the predetermined value range VS), so that more number of subsequent ROI data may be stored in the on-chip memory $M_{ONCP}$ with at least the same or higher opportunity, so as to ensure that replacements of ROI data may be controlled with higher randomness and to ensure the precision of the final detection result.

In the example method of FIG. 3 or FIG. 4, once obtaining or generating an item of ROI data, the ROI data may be filtered directly in the step S120 according to the score of the ROI. Then, in the step S130, aspects such as whether to continue to store the ROI data and how to store the ROI data may be determined according to the remaining capacity of the storage region SR or also based on the value of the generated random number RV.

Table 1 shows storage strategies determined for data $D_1$ of $ROI_1$ in the example of FIG. 3 or FIG. 4 in different cases.

TABLE 1

| No. | Score $S_1$ of $ROI_1$ satisfies predetermined condition? | Storage region SR has sufficient remaining capacity? | Random number RV is within predetermined value range VS? | Storage strategy for $D_1$ |
|---|---|---|---|---|
| 1 | No | — | — | Discarding $D_1$ |
| 2 | Yes | Yes | — | Storing D1 into an idle region of SR |
| 3 | Yes | No | No | Discarding $D_1$ |
| 4 | Yes | No | Yes | Storing $D_1$ into SR by overriding $D_2$ already stored in SR |

Through the step S120, the number of ROI data which should have been up to millions or hundreds of thousands may be reduced to, for example, tens of thousands. Through the step S130, the number of ROI data which may be tens of thousands may be further reduced to thousands such as 2000 or 4000, so that the on-chip memory $M_{ONCP}$ which usually has hundreds of kilobytes to several megabytes is available to store all ROI data finally kept. As described above, through the random control in the step S130, the precision of the final detection result may be ensured by all of the ROI data finally stored in the on-chip memory $M_{ONCP}$.

In the example method of FIG. 3 or FIG. 4, one item of ROI data is obtained and processed. ROI data may be obtained (or generated) and processed by executing the example method of FIG. 3 or FIG. 4 in a pipelined way.

For example, when the step S110 includes generating ROI data, in the steps S110, S120, and S130, it may spend more time to generate ROI data in the step S110 and to store ROI data in on-chip memory MONCP in the step S130.

Figure 7:
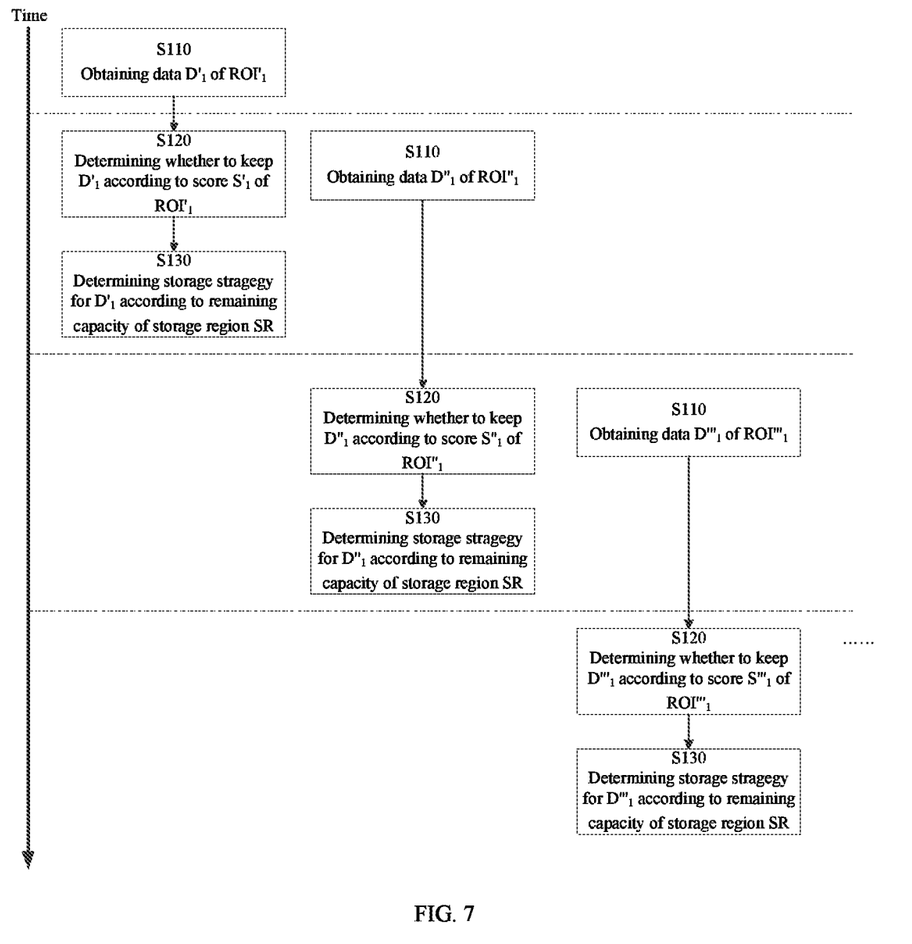
FIG. 7 shows an example pipelined execution of the method of the present disclosure.

Thus, in an embodiment, for example as shown in FIG. 7, the step S110 for $ROI''_1$ may be performed in parallel with the steps S120 and S130 for $ROI'_1$, the step S110 for $ROI'''_1$ may be performed in parallel with the steps S120 and S130 for $ROI''_1$, and so on.

The pipelined manner may be supported by hardware, and may reduce total processing time, and may further improve both utilization of on-chip hardware resources and processing performance, compared with the way of processing ROI data one by one.

It is appreciated that the pipelined manner which may be applied in the disclosure may be not limited to the example of FIG. 7.

In addition, according to the above Table 1, the method for controlling the storage operations of ROI data according to embodiments of the disclosure may be not limited to the example flow of FIG. 3 or FIG. 4.

For example, by means of an enable signal of hardware and/or control for an enable/disable state, the method for controlling the storage operations of ROI data according to the embodiments of the disclosure may be split into a control method in a case where the remaining capacity of the storage region SR is sufficient and a control method in a case where the remaining capacity of the storage region SR is insufficient. For example, the above LFSR may be disabled when the remaining capacity of the storage region SR is sufficient, and may be enabled when the remaining capacity of the storage region SR is insufficient.

Figure 8:
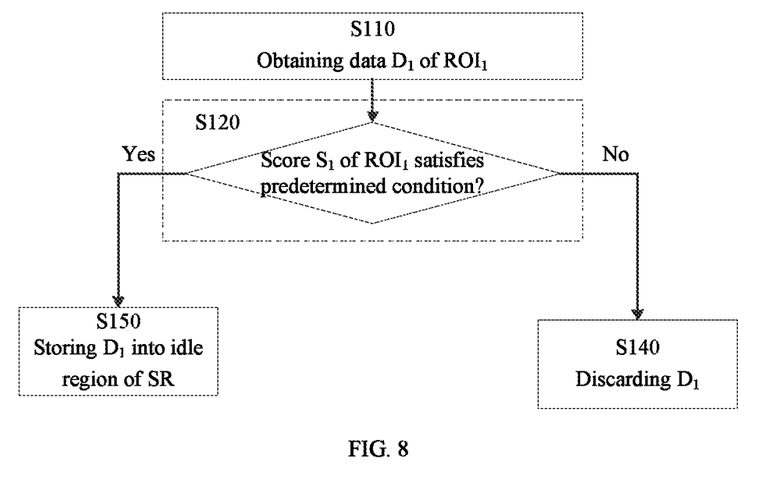
FIG. 8 shows an example method for controlling storage operations of ROI data according to an embodiment.

When the remaining capacity of the storage region SR is sufficient, the method as shown in FIG. 8 may be executed to obtain and store the ROI data, wherein, for example, the step S150 may be executed directly if the checking result of the step S120 is "Yes".

Figure 9:
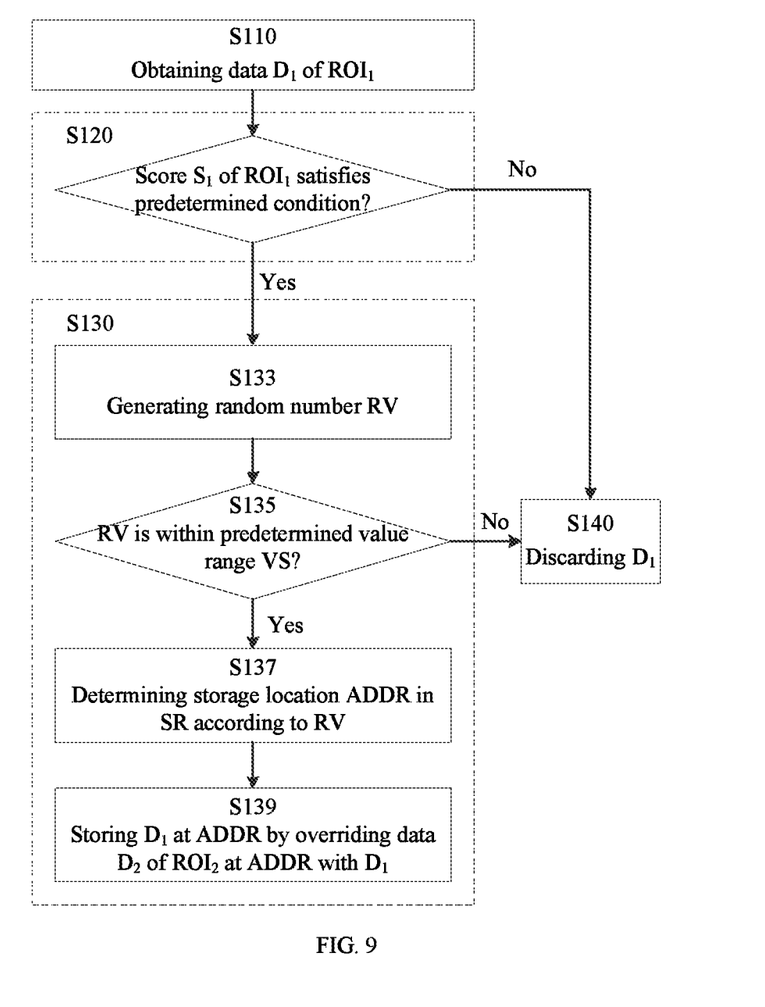
FIG. 9 shows an example method for controlling storage operations of ROI data according to an embodiment.

When the remaining capacity of the storage region SR is insufficient, the method as shown in FIG. 9 may be executed to obtain and store the ROI data, wherein, for example, the sub-step S133 in the step S130 may be executed directly if the checking result of the step S120 is "Yes".

Figure 10:
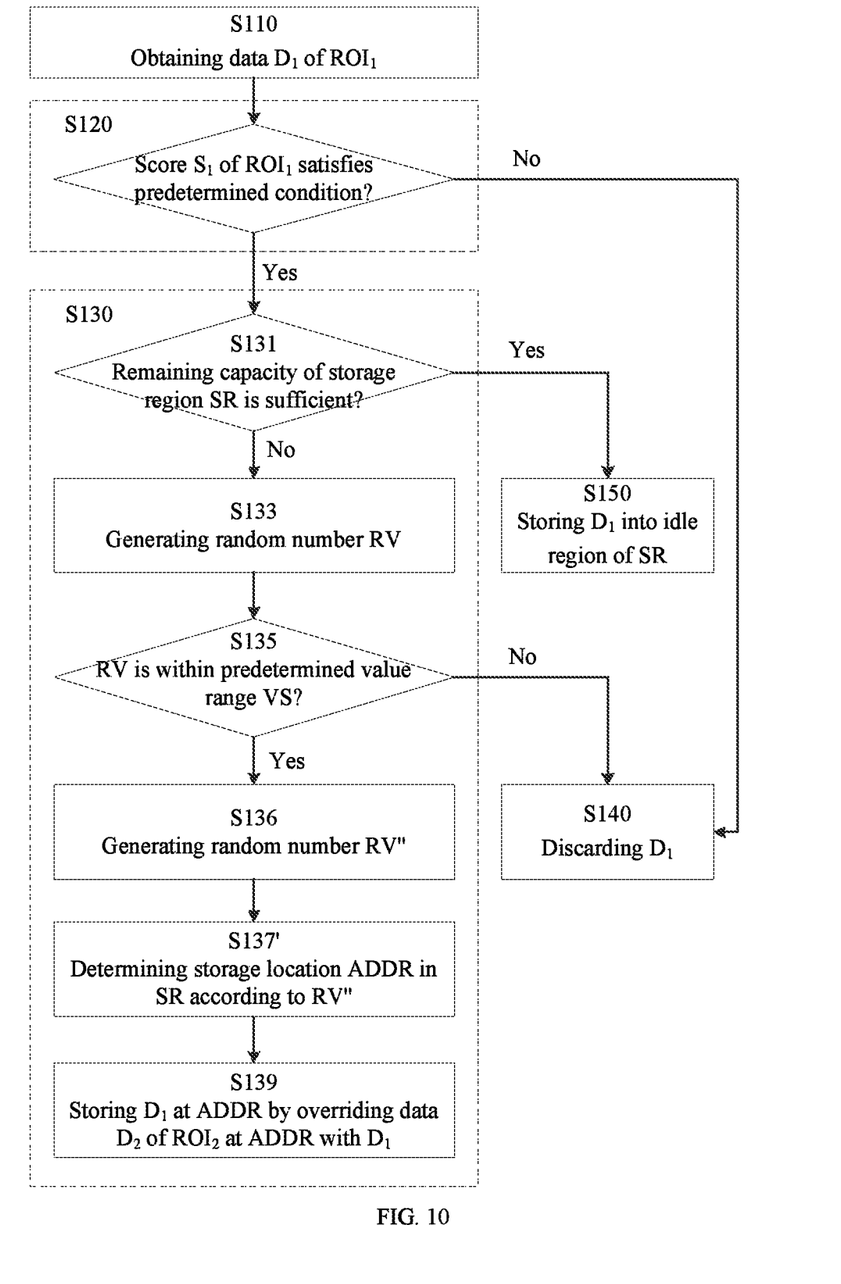
FIG. 10 shows an example method for controlling storage operations of ROI data according to an embodiment.

In another example, as shown in FIG. 10, the random number RV generated in the sub-step S133 may be used only to determine whether to discard $D_1$. For example, the random number RV may be a Boolean value, and the predetermined data value range VS may be a range containing only true values. For example, when utilizing the LFSR in the example of FIG. 6, the predetermined data value range VS may also be set to a subset of [0, 4095], for example [0, 2047].

Then, as shown in FIG. 10, the step S130 may further include a sub-step S136 of generating another random number RV" when the checking result of the sub-step S135 is "Yes", and the sub-step 137 in FIG. 4 may be replaced with a sub-step S137' for determining ADDR according to the random number RV".

Figure 11:
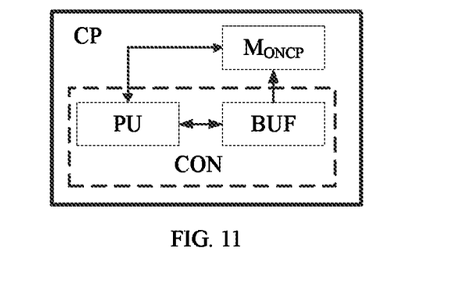
FIG. 11 shows an example apparatus for controlling storage operations of ROI data according to an embodiment.

FIG. 11 shows an example apparatus CON for controlling the storage operations of ROI data according to an embodiment. In this example, the example apparatus CON may include a processor PU and a buffer BUF, and may be embodied as an on-chip apparatus on a chip together with other on-chip components or circuits such as the on-chip memory $M_{ONCP}$.

Based on different chip architectures, for example, the processor (or the on-chip processor) PU may be a lightweight processor kernel developed based on a GPU, an ARM processor, or an FPGA. For example, the processor PU may be a RISC soft processor kernel developed based on FPGA.

In various embodiments, the buffer BUF may be a cache independent of the on-chip memory $M_{ONCP}$, and may be also a storage region determined based on the on-chip memory $M_{ONCP}$, which is different from the storage region SR.

In an embodiment, the processor PU may be started when being powered on, and may execute predetermined instruction sequences to perform the steps in the above example methods in various embodiments.

For example, the processor PU may instruct to read at least a portion of the image to be detected from the off-chip memory $M_{OFFCP}$ (see FIG. 1) into the on-chip memory $M_{ONCP}$ according to a predetermined instruction sequence, and then may obtain ROI data of an object of interest in the image based on data in the on-chip memory $M_{ONCP}$, and buffer the ROI data into the buffer BUF (see the step S110 in the above example method).

Then, the processor PU may determine a storage strategy for the ROI data in the buffer BUF (for example, see the steps S120 and S130 in the above example method and/or the above Table 1), and may either discard the ROI data in the buffer BUF or store the ROI data in the buffer BUF into a specified storage region SR in the on-chip memory $M_{ONCP}$, according to different conditions.

In various embodiments, through the operations of the processor PU, ROI data generated for an object of interest in the image to be detected may be eventually stored into the on-chip memory $M_{ONCP}$ completely.

Then, the processor PU may perform subsequent operations or steps in the multi-stage object detection method based on the ROI data in the on-chip memory $M_{ONCP}$, such as sorting the ROI data, executing NMS, determining a category of each ROI, and executing boundary regression, so as to obtain a final detection result for the object of interest in the image.

Except for a possibility of obtaining an initial input tensor (for example, at least a portion of the image to be detected) from the off-chip memory $M_{OFFCP}$ during obtaining the ROI data, through the on-chip apparatus CON in the embodiment, the AI chip CP may implement the multi-stage object detection based on ROI data independently and efficiently, and may ensure the accuracy and precision of the final detection result.

In another embodiment, an operation part such as the operations of the above steps S120 and S130 may be separated from the processor PU in the example of FIG. 11, so as to obtain a higher execution efficiency and/or support for pipelined operations.

Figure 12:
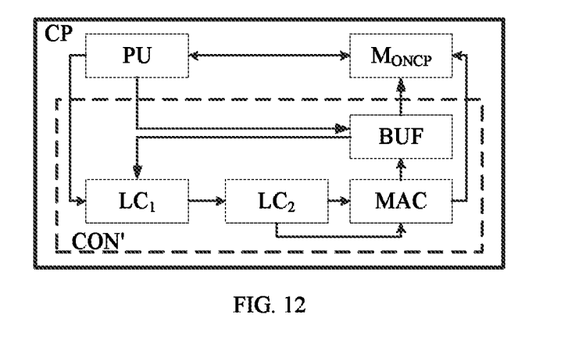
FIG. 12 shows an example apparatus for controlling storage operations of ROI data according to an embodiment.

For example, as shown in FIG. 12, an example apparatus CON' in an embodiment may include a buffer BUF, a first circuit $LC_1$, a second circuit $LC_2$, and a storage control circuit MAC.

In various embodiments, the apparatus CON' may include the processor PU, or not include the processor PU. When including the processor PU, the operations executable by the apparatus CON' may also include the steps S120 and S130 in the above example method, and the operation of the step S110 may include receiving ROI data from the processor PU and buffering the received ROI data into the buffer BUF.

In an embodiment, the apparatus CON' may be started in response to detecting that valid ROI data has been stored in the buffer BUF, or according to a signal or instruction from the processor PU where, for example as shown by an arrow from the processor PU pointing to the first circuit $LC_1$ in FIG. 12, an enable terminal of the device CON' may correspond to an enable terminal of the first circuit $LC_1$.

Hereinafter, for simplicity, it is assumed that an enable signal corresponds to a non-zero value or a high level such as "1" and a disable signal corresponds to a zero value or a low level. However, it is appreciated that forms of the enable signal and the disable signal are not limited to the examples described herein.

An input terminal of the first circuit $LC_1$ may be coupled to an output terminal of the buffer BUF. The first circuit $LC_1$ may be configured to perform operations for example in the above step S120, when being started, so as to determine whether to keep the data $D_1$ of $ROI_1$ according to the score (e.g. the confidence or the substitute value for the confidence) of $ROI_1$ currently buffered in the buffer BUF.

An output terminal of the first circuit $LC_1$ may be coupled to an enable terminal of the second circuit $LC_2$, and the first circuit $LC_1$ may be further configured to provide an enable signal to the second circuit $LC_2$ when determining to keep the data $D_1$ of $ROI_1$.

For example, the second circuit $LC_2$ may be configured to start in response to receiving an enable signal or instruction from the first circuit $LC_1$, and to perform a portion of the operations in the above step S130, including detecting whether the capacity of the storage region SR pre-allocated in the on-chip memory $M_{ONCP}$ for storing ROI data is sufficient and determining the storage strategy for the data $D_1$ of $ROI_1$ according to the detection result, wherein the determined storage strategies in different situations may include indicating to override the data $D_2$ of another region of interest $ROI_2$ already stored in the storage region SR with the data $D_1$ when the remaining capacity of the storage region SR is insufficient.

The two output terminals of the second circuit $LC_2$ may be coupled to the enable terminal and the input terminal of the storage control circuit MAC, respectively, so as to provide information such as the enable signal and/or a storage location in the on-chip memory $M_{ONCP}$ to the storage control circuit MAC when determining to store the data $D_1$.

The storage control circuit MAC may be coupled to the buffer BUF and/or the on-chip memory $M_{ONCP}$, and may be configured to control to store the data $D_1$ currently in the buffer BUF to a specified storage location in the storage region SR in the on-chip memory $M_{ONCP}$ according to an indication from the output terminal of the second circuit $LC_2$. In an embodiment, for example, the storage control circuit MAC may be a portion of an on-chip memory controller.

Figure 13:
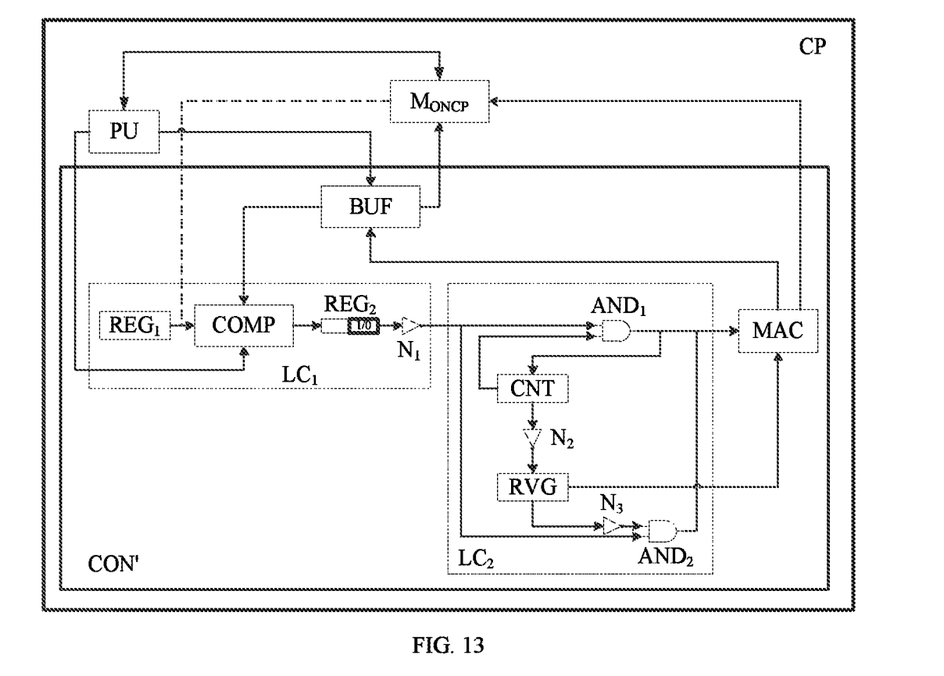
FIG. 13 shows an example apparatus for controlling storage operations of ROI data according to an embodiment.

FIG. 13 shows an example implementation of the example apparatus CON' of FIG. 12. It is appreciated that the implementation of the example apparatus CON' of FIG. 12 is not limited to the example of FIG. 13.

In the example of FIG. 13, the first circuit $LC_1$ may include a value comparator COMP. An enable terminal of the value comparator COMP may be coupled to the processor PU, so as to receive enable information which is from the processor PU or sent according to an indication/instruction of the processor PU. An input terminal of the value comparator COMP may be coupled to the buffer BUF, so as to obtain the score of $ROI_1$.

In the example of FIG. 13, the first circuit $LC_1$ may further include a register $REG_1$ for storing a threshold for comparison, and an output terminal of the register REG1 may be coupled to another input terminal of the value comparator COMP.

Rather than being limited to the register $REG_1$ in the example of FIG. 13, the first circuit $LC_1$ may also include any suitable storage component capable of executing the same functions, and the threshold for the comparison may be predetermined or firmed into the storage component.

In another embodiment, a threshold for comparing scores may also be stored in the on-chip memory MONCP without configuring the register $REG_1$ individually. In this embodiment, another input terminal of the value comparator COMP may be coupled to the on-chip memory $M_{ONCP}$ as shown by a dashed line between the value comparator COMP and the on-chip memory $M_{ONCP}$ in FIG. 13.

In an embodiment, the value comparator COMP may include one or more integrated value comparators such as one or more 74LS85 integrated numeric comparators, wherein each integrated value comparator may include a plurality of logic gate elements. For example, a 74LS85 integrated numeric comparator may directly support a comparison between 4-bit values. Further, more than two 74LS85 comparators may be connected in series and/or in parallel, so as to support a comparison between 8-bit values or 16-bit values or values with more bits.

It is appreciated that the value comparator COMP in the embodiments is not limited to the type, number, model, and connection of the integrated value comparator used internally. The value comparator COMP in another embodiment may also be implemented with any other suitable circuit structure available for comparing values.

An output terminal of the value comparator COMP may be coupled directly to the enable terminal of the second circuit $LC_2$ if a result finally output by the value comparator COMP may indicate directly whether the predetermined condition is satisfied, for example when the output of the value comparator COMP is a Boolean value of 1 indicating "satisfied" or 0 indicating "not satisfied", or when values output by the value comparator COMP includes binary values of "10", "01", and "00" representing "greater than", "equal to", and "less than", respectively, with a non-zero value indicating "satisfied" and a zero value indicating "not satisfied".

In another embodiment, the first circuit $LC_1$ may further include one or more additional registers and/or one or more logic gate elements if the result finally output by the value comparator COMP cannot indicate directly or simply whether the predetermined condition is satisfied, for example when the values output by the value comparator COMP includes binary values of "10", "01", and "00" representing "greater than", "less than", and "equal to", respectively, or when the condition to be detected involves comparisons with a plurality of thresholds.

For example, in the example of FIG. 13, when the values output by the value comparator COMP includes binary values of "10", "01", and "00" representing "greater than", "less than", and "equal to", respectively, and when it is predetermined to discard ROI data if the score of the ROI is less than the threshold, the first circuit $LC_1$ may include a register $REG_2$ and a NOT gate $N_1$ wherein an input terminal of the register $REG_2$ may be coupled to the output of the value comparator COMP, and wherein a register bit corresponding to the lowest bit of the binary values "10", "01" and "00" in the register $REG_2$, for example the register bit represented by a thick line frame on the rightmost side of REG2 in the example of FIG. 13, may be coupled to an input terminal of the NOT gate $N_1$.

Thus, when the value output from the value comparator COMP into the register $REG_2$ is "10" or "00", the NOT gate $N_1$ outputs an enable signal at a high level, and when the value output from the value comparator COMP into the register $REG_2$ is "01", the NOT gate $N_1$ outputs a disable signal at a low level.

Thus, the first circuit $LC_1$ may detect whether the score of the ROI data currently stored in the buffer BUF is greater than or equal to the threshold stored in $REG_1$. When the score of the ROI data in the buffer BUF is greater than or equal to the threshold stored in the $REG_1$, an enable signal may be provided from the first circuit $LC_1$ to the second circuit $LC_2$.

As described above, depending on the conditions to be detected by the first circuit LC1 and forms of the outputs of the value comparator COMP, the first circuit $LC_1$ may include one or more additional logic gate elements, rather than being limited to the example of FIG. 13.

Then, in the example of FIG. 13, the second circuit $LC_2$ may include a counter CNT, NOT gates $N_2$ and $N_3$, a random number generator RVG, and AND gates $AND_1$ and $AND_2$.

An input terminal of the AND gate $AND_1$ may be coupled to the output of the NOT gate $N_1$ in the first circuit $LC_1$, another input terminal of the AND gate $AND_1$ may be coupled to an output terminal of the counter CNT, and an output terminal of the AND gate $AND_1$ may be coupled to an enable signal output terminal of the second circuit $LC_2$ and may be further coupled to the enable terminal of the storage control circuit MAC.

The counter CNT may be a counter for counting down to 0 from a predetermined maximum value such as the maximum number N of ROI data which is predetermined to be finally kept and stored in the on-chip memory $M_{ONCP}$. The enable terminal of the counter CNT may be coupled to the output terminal of the AND gate $AND_1$, and the output terminal of the counter CNT may be coupled to an input terminal of the NOT gate $N_2$.

In an embodiment, as shown by a dotted line between CNT and MAC in FIG. 13, the output terminal of the counter CNT may be also coupled to the input terminal of the storage control circuit MAC, so as to allow the storage control circuit MAC to determine directly an idle storage location according to the counting value of the counter CNT when the storage control circuit MAC is enabled.

An enable terminal of the random number generator RVG may be coupled to an output terminal of the NOT gate $N_2$. An output terminal of the random number generator RVG may be coupled to an input terminal of the NOT gate $N_3$, and may be also coupled to the input terminal of the storage control circuit MAC.

In an embodiment, for example, the random number generator RVG may include a linear feedback shift register LFSR as shown in FIG. 6 and a shift register. For example, the linear feedback shift register LFSR may be used to generate the aforementioned random number RV' when being enabled. The shift register may be connected in series with the linear feedback shift register LFSR, and may be used to perform modulo operations on the output value of the linear feedback shift register LFSR, for example, through shifting or truncation, so as to obtain the aforementioned random number RV. In another embodiment, the random number generator RVG may also include any other suitable circuit or module or element, and may implement the function of generating random numbers within a specified value range with any other suitable circuit structure.

An input terminal of the AND gate $AND_2$ may be coupled to the output of the NOT gate $N_1$ in the first circuit $LC_1$, another input terminal of the AND gate $AND_2$ may be coupled to the output terminal of the NOT gate $N_2$, and the output terminal of the AND gate $AND_2$ may be coupled to the enable signal output terminal of the second circuit $LC_2$ and further to the enable terminal of the storage control circuit MAC.

In the second circuit $LC_2$ in FIG. 13, the AND gate $AND_1$ may provide an enable signal at a high level to the enable terminal of the storage control circuit MAC and the enable terminal of the counter CNT when the NOT gate $N_1$ the first circuit $LC_1$ outputs a signal at a high level (i.e. the first circuit $LC_1$ determines to keep the data in the buffer BUF) and the counting value of the counter CNT is not 0 (i.e. the remaining capacity of the storage region SR pre-allocated for storing the ROI data in the on-chip memory $M_{ONCP}$ is sufficient), so that, in response to the output signal from the AND gate $AND_1$, the storage control circuit MAC may store data in the buffer BUF into an idle region in the storage region SR in the on-chip memory $M_{ONCP}$, and the counter CNT may decrement the counting value by 1. Thus, the processing corresponding to the item No. 2 in the above Table 1 may be implemented.

When the counting value of the counter CNT is not 0, the enable terminal of the random number generator RVG is at a low level, and thus is disabled. When the counting value of the counter CNT is 0 indicating that the remaining capacity of the storage region SR is insufficient, an enable signal at the high level is received at the enable terminal of the random number generator RVG, and thus a generation of the random number RV is started.

The AND gate $AND_2$ may provide an enable signal at high level to the enable terminal of the enable terminal of the storage control circuit MAC when the NOT gate $N_1$ in the first circuit $LC_1$ outputs a signal at a high level (i.e. the first circuit $LC_1$ determines to keep the data in the buffer BUF) and the counting value of the counter CNT is not 0 (i.e. the NOT gate $N_3$ becomes a high level).

Then, in respond to the signal output from the AND gate $AND_2$, the storage control circuit MAC may determine a storage location in the storage region SR according to the random number RV when the remaining capacity of the storage region SR is insufficient and the random number RV generated by the random number generator RVG belongs to a predetermined data range, wherein another ROI data (e.g. $D_2$ of the aforementioned $ROI_2$) has been stored at this storage location. Then, the storage control circuit MAC may control to store the data in the buffer BUF (i.e., $D_1$ of $ROI_1$) into the storage region SR by overriding $D_2$ of $ROI_2$ which has already been stored in the storage region SR. Thus, the processing corresponding to the item No. 4 in the above Table 1 may be implemented.

When the NOT gate $N_1$ in the first circuit $LC_1$ outputs a low level or the AND gate $AND_1$ in the second circuit $LC_2$ outputs a low level, the storage control circuit MAC does not store the data in the buffer BUF into the on-chip memory $M_{ONCP}$. The original ROI data stored in the buffer BUF may be discarded by storing a next ROI data into the buffer BUF by the processor PU. Thus, the processing corresponding to the item No. 1 or 3 in the above Table 1 may be implemented.

In the example apparatus CON' in an embodiment, the number of ROI data which are generated by the processor PU and finally stored into the on-chip memory $M_{ONCP}$ may be controlled efficiently.

In another embodiment, for example, the buffer BUF in the apparatus CON' in the example of FIG. 12 or FIG. 13 may include two storage units $C_1$ and $C_2$, each storage unit may store an item of ROI data, and the processor PU and the example apparatus CON' may be configured to access the two storage units in the buffer BUF alternately.

For example, the processor PU may buffer an item of generated ROI data into the storage unit $C_1$ and indicate the CON' to process the data in the storage unit $C_1$. Then, the processor PU may generate another ROI data during the processing for the data in the storage unit $C_1$ by CON', and may buffer the ROI data into the storage unit $C_2$. Then, after the data in the storage unit $C_1$ is processed by the CON', the CON' may detect whether there is new data stored in the storage unit $C_2$. If yes, the CON' may process the data in the storage unit $C_2$. A pipelined control of the generation and storage of ROI data may be implemented by repeating the above steps. An example is shown in FIG. 7. By means of the pipelined control, the utilization of hardware resources in the chip and the data processing efficiency may be improved, and thus the performance of the chip may be improved.

In another embodiment, the buffer BUF in the example apparatus CON' may also include more storage units, so as to further reduce the possible waiting during which the processor PU and the example apparatus CON' wait for each other.

It is appreciated that the example apparatuses CON and CON' in FIG. 10 to FIG. 13 are examples, and the implementations of the apparatus for controlling the storage of ROI data (possibly also including generating ROI data) according to the embodiments are not limited to these examples.

FIGS. 10 to 13 also show an examples AI chip CP according to an embodiment.

In various embodiments, the AI chip CP may also include other components or modules or circuits or units or elements, such as components for executing or accelerating the calculations of the artificial neural network (e.g. the calculation engine CE in the example of FIG. 1), a timing controller for instruction timing control, an interrupt controller for instruction interrupt control, a crossbar and/or multiplexer for interconnections among components, a coprocessor, an an off-chip data transfer manager for controlling access to data in the off-chip memory $M_{OFFCP}$.

The AI chip CP in the embodiments may implement the multi-stage object detection based on the proposal operation or ROI data independently and efficiently, for example without additional high performance processors outside of the chip, but may ensure the precision of final detection results, so that the AI chip CP may be applied to a terminal device, such as a mobile phone, so as to enable the terminal device to detect the objects of interest efficiently and accurately.

Embodiments of the disclosure may also include an electronic device including the AI chip according to an embodiment, such as a mobile phone, a navigator, a vehicle and anti-collision warning device.

In addition to the above methods and apparatus, embodiments of the present disclosure may also be a computer program product comprising computer program instructions. The computer program instructions, when being executed by a processor, cause the processor to execute the steps of the above method according to various embodiments of the present disclosure.

The computer program product may write program code for executing operations of embodiments of the present disclosure in any combination of one or more programming languages, said programming languages include object-oriented programming languages, such as Java, C++, etc., and conventional procedural programming languages, such as "C" language or similar programming languages. The program code may be executed entirely on user computing device, be partially executed on user device, be executed as a stand-alone software package, be partially executed on user computing device and be partially executed on remote computing device, or be entirely executed on remote computing device or server.

Furthermore, embodiments of the present disclosure may also be a computer readable storage medium having computer program instructions stored thereon. The computer program instructions, when being executed by a processor, cause the processor to execute the steps of the above method according to various embodiments of the present disclosure.

The computer-readable storage medium may use any combination of one or more readable media. The readable medium may be a readable signal medium or a readable storage medium. The computer-readable storage medium may include, but are not limited to, system, apparatus, or devices of electric, magnetic, optical, electromagnetic, infrared, or semiconductor, or any combination of the above. More examples (a non-exhaustive list) of readable storage medium include electrical connections with one or more wires, portable disks, hard disks, random access memory (RAM), read only memory (ROM), erasable programmable read only memory (EPROM or flash memory), optical fibers, portable compact disk read only memory (CD-ROM), optical storage devices, magnetic storage devices, or any suitable combination of the above.

The present disclosure has been described above in conjunction with the embodiments. However, it is appreciated that the advantages, superiorities, and effects and so on mentioned in the present disclosure are examples but not intended to limit the present invention, and these advantages, superiorities, effects and so on will not be considered as essential to the embodiments of the present disclosure. In addition, the details of the foregoing disclosure are only for illustration and ease of understanding but not for limitation, and the above details do not limit the application to be implemented in the details mentioned above.

The block diagrams of devices, apparatuses, equipments, systems referred to in the present disclosure are illustrative examples and are not intended to require or imply that the connections, arrangements, and configurations must be made in the manner shown in the block diagram. These devices, apparatuses, equipments, systems, may be connected, arranged, or configured in any manner. Terms such as "including", comprising", "having" and the like are open words, which means "including, but not limited to" and may be used interchangeably. The terms "or" and "and" as used herein refer to the term "and/or" and may be used interchangeably, unless the context clearly dictates otherwise. The term "such as" as used herein refers to the phrase "such as but not limited to" and is used interchangeably.

It is also appreciated that in the apparatuses, equipments, and methods of the present disclosure, each component or step may be decomposed and/or recombined. These decompositions and/or recombination should be regarded as an equivalent of the present disclosure.

The modifiers without quantifiers, such as "first" and "second", are be used for distinguish different elements, components, circuits, modules, apparatuses, or steps, rather than to emphasize order, positional relationship, importance, priority, or the like, while the modifiers with quantifiers, such as "the first one" and "the second one", may be used to emphasize order, positional relationship, importance, priority, and so on, of different elements, components, circuits, modules, apparatuses, or steps.

The above description of the disclosed aspects is provided to enable to make or use the application. Various modifications to these aspects may be made. Therefore, the present disclosure is not intended to be limited to the aspects shown herein, but rather to present the broadest scope consistent with the principles and novel features disclosed herein.

The above description has been provided for illustration and description. In addition, the description is not intended to limit the embodiments of the present disclosure to the forms disclosed herein. Although various example aspects and embodiments have been discussed above, some variations, modifications, alterations, additions and sub-combinations thereof may be recognized.

What is claimed is:

1. A method for controlling storage operations of data of Region of Interest (ROI), comprising:
   obtaining data of a first ROI;
   determining to keep the data of the first ROI according to a score of the first ROI; and
   overriding data of a second ROI already stored in a storage region for storing ROI data with the data of the first ROI in a case where a remaining capacity of the storage region is insufficient,
   wherein the overriding the data of the second ROI already stored in the storage region with the data of the first ROI comprises:
   generating a random number;
   determining a storage location of the data of the second ROI in the storage region according to the random number; and
   storing the data of the first ROI at the storage location in the storage region by overriding the data of the second ROI.

2. The method of claim 1 wherein the score includes a confidence of the first ROI or a substitute value for the confidence, the substitute value being a value obtained by omitting a nonlinear operation during determining the confidence.

3. The method of claim 1 wherein the determining to keep the data of the first ROI according to the score of the first ROI comprises:
   determining to keep the data of the first ROI in a case where the score of the first ROI satisfy a predetermined condition.

4. The method of claim 1 further comprising:
   discarding the data of the first ROI in a case where the random number is not in a predetermined value range.

5. The method of claim 1 further comprising:
   storing the data of the first ROI into an idle region of the storage region in a case where the remaining capacity of the storage region is sufficient.

6. An apparatus for controlling storage operations of data of Region of Interest (ROI), comprising:
   a processor configured to cause the apparatus to perform at least obtaining data of a first ROI, determining to keep the data of the first ROI according to a score of the first ROI, and overriding data of a second ROI already stored in a storage region of a memory for storing ROI data with the data of the first ROI in a case where a remaining capacity of the storage region is insufficient; and a buffer configured to buffer at least the data of the first ROI, wherein the processor is further configured to cause the apparatus to perform generating a random number, determining a storage location of the data of the second ROI in the storage region according to the random number, and storing the data of the first ROI at the storage location in the storage region by overriding the data of the second ROI.

7. The apparatus of claim 6 wherein the score includes a confidence of the first ROI or a substitute value for the confidence, the substitute value being a value obtained by omitting a nonlinear operation during determining the confidence.

8. The apparatus of claim 6 wherein the processor is further configured to cause the apparatus to perform determining to keep the data of the first ROI in a case where the score of the first ROI satisfy a predetermined condition.

9. The apparatus of claim 6 wherein the processor is further configured to cause the apparatus to perform discarding the data of the first ROI in a case where the random number is not in a predetermined value range.

10. The apparatus of claim 6 wherein the processor is further configured to cause the apparatus to perform storing the data of the first ROI into an idle region of the storage region in a case where the remaining capacity of the storage region is sufficient.

11. An apparatus for controlling storage operations of data of Region of Interest (ROI), comprising:
 a buffer configured to buffer obtained data of a first ROI;
 a first circuit configured to determine whether to keep the data of the first ROI according to a score of the first ROI;
 a second circuit configured to instruct to override data of a second ROI already stored in a storage region of a memory for storing ROI data with the data of the first ROI to be kept in a case where a remaining capacity of the storage region is insufficient;
 a storage control circuit configured to control to store the data of the first ROI into the storage region according to an instruction from the second circuit; and
 a random number generator configured to generate a random number,
 the second circuit being further configured to determine a storage location of the data of the second ROI in the storage region according to the random number, and to store the data of the first ROI at the storage location in the storage location by overriding the data of the second ROI.

12. The apparatus of claim 11 wherein the score includes a confidence of the first ROI or a substitute value for the confidence, the substitute value being a value obtained by omitting a nonlinear operation during determining the confidence.

13. The apparatus of claim 11 wherein the first circuit is configured to determine to keep the data of the first ROI in a case where the score of the first ROI satisfy a predetermined condition.

14. The apparatus of claim 11 wherein the first circuit is configured to determine to discard the data of the first ROI in a case where the random number is not in a predetermined value range.

15. The apparatus of claim 11 wherein the second circuit is configured to determine to instruct to store the data of the first ROI into an idle region of the storage region in a case where the remaining capacity of the storage region is sufficient.

16. An electric device comprising an apparatus for controlling storage operations of data of Region of Interest (ROI), the apparatus comprising:
 a processor configured to cause the apparatus to perform at least obtaining data of a first ROI, determining to keep the data of the first ROI according to a score of the first ROI, and overriding data of a second ROI already stored in a storage region of a memory for storing ROI data with the data of the first ROI in a case where a remaining capacity of the storage region is insufficient; and
 a buffer configured to buffer at least the data of the first ROI,
 wherein the processor is further configured to cause the apparatus to perform generating a random number, determining a storage location of the data of the second ROI in the storage region according to the random number, and storing the data of the first ROI at the storage location in the storage region by overriding the data of the second ROI.

17. An electric device comprising an apparatus for controlling storage operations of data of Region of Interest (ROI), the apparatus comprising:
 a buffer configured to buffer obtained data of a first ROI;
 a first circuit configured to determine whether to keep the data of the first ROI according to a score of the first ROI;
 a second circuit configured to instruct to override data of a second ROI already stored in a storage region of a memory for storing ROI data with the data of the first ROI to be kept in a case where a remaining capacity of the storage region is insufficient;
 a storage control circuit configured to control to store the data of the first ROI into the storage region according to an instruction from the second circuit; and
 a random number generator configured to generate a random number,
 the second circuit being further configured to determine a storage location of the data of the second ROI in the storage region according to the random number, and to store the data of the first ROI at the storage location in the storage location by overriding the data of the second ROI.

* * * * *

UNITED STATES PATENT AND TRADEMARK OFFICE
CERTIFICATE OF CORRECTION

| | | |
|---|---|---|
| PATENT NO. | : 11,163,443 B2 | Page 1 of 1 |
| APPLICATION NO. | : 16/713895 | |
| DATED | : November 2, 2021 | |
| INVENTOR(S) | : Zhang | |

It is certified that error appears in the above-identified patent and that said Letters Patent is hereby corrected as shown below:

In the Specification

Column 15, Line 16, insert -- in -- between "$N_1$" and "the".

Signed and Sealed this
Twenty-first Day of June, 2022

Katherine Kelly Vidal
*Director of the United States Patent and Trademark Office*